United States Patent [19]

Mizota

[11] 4,373,205

[45] Feb. 8, 1983

[54] RADIO SUBSCRIBER SYSTEM WITH EFFICIENT USE OF RADIO FREQUENCY CARRIER WAVES

[75] Inventor: Yasuhiro Mizota, Tokyo, Japan

[73] Assignee: Nippon Electric Co., Ltd., Tokyo, Japan

[21] Appl. No.: 157,797

[22] Filed: Jun. 9, 1980

[30] Foreign Application Priority Data

Jun. 12, 1979 [JP] Japan .................................. 54-74107

[51] Int. Cl.³ .............................................. H04B 1/40
[52] U.S. Cl. ..................................................... 455/86
[58] Field of Search ...................... 455/75, 76, 77, 84, 455/85, 86, 87

[56] References Cited

U.S. PATENT DOCUMENTS

| | | | |
|---|---|---|---|
| 3,426,279 | 2/1969 | Berman | 455/85 |
| 3,829,778 | 8/1974 | Amoroso, Jr. | 455/86 |
| 4,153,876 | 5/1979 | Cochran | 455/84 |
| 4,231,116 | 10/1980 | Sekiguchi | 455/87 |

OTHER PUBLICATIONS

PR 1010 Reginal Crime Squad Radio Transceiver, by A.D. Currah, International Conference on Communications Equipment and Systems, Brighton, Sussex, England (8–11, Jun. 1976) pp. 106–109.
Radio Subscribed System, by Miyawaki, et al., NEC Research & Development, No. 53, Apr. 1979, pp. 36–45.
Phase locked loop Systems, Data Book, Motorola Semiconductor Products Inc. Second Edition, Aug. 1973, pp. 1–11.

Primary Examiner—Tommy P. Chin
Attorney, Agent, or Firm—Laff, Whitesel, Conte & Saret

[57] ABSTRACT

A radio subscriber system switches between a plurality of radio link channels and seizes one responsive to an idle tone appearing thereon. A control circuit uses a microprocessor to select transmit and receive carrier frequencies for the seized channel. This selection is made by storing the channel identification in a random access memory while interrogating a read-only memory for channel frequency assignments. The control circuit identifies the seized circuit by channel signals which are demodulated when the seizure occurs.

2 Claims, 7 Drawing Figures

RADIO SUBSCRIBER SYSTEM WITH EFFICIENT USE OF RADIO FREQUENCY CARRIER WAVES

The present invention relates to a radio communication system in which a plurality of radio frequency carrier waves are used, in common, by a plurality of subscribers, and more particularly a carrier wave switching device disposed at a subscribers' transmitter/receiver set in such a radio communication system.

In this kind of system, the ordinary telephone exchange network and a plurality of radio subscriber system (RSS) subscribers are linked by radio frequency carrier waves. This type of system involves RSS exchange equipment and a radio base station, to provide an interface between the wired line communication of the ordinary telephone exchange network and the wireless communication on the RSS subscriber side. For further details on such a system, reference is made to "Radio Subscriber System" published in NEC Research & Development, No. 53, pp. 36–45, April 1979.

In this RSS, the frequency arrangement of carrier waves is such as to allocate, for one frequency band, a plurality of transmission frequency carrier waves. For another frequency band, the reception frequency carrier waves is allocated in a one-to-one correspondence to the plurality of transmission frequency carrier waves. These one-to-one corresponding pairs of transmission and reception frequencies are usually called channels. The frequency interval between the transmission and reception carrier waves of each channel is constant and fixed. To enable the transmitter/receiver sets of a plurality of RSS subscribers to commonly use the plurality of allocated channels, each transmitter/receiver set is provided with a switch to select one of these channels for either transmission or reception.

The system described in the aforementioned, NEC Research & Development, literature accomplishes this channel switching. The RSS exchange equipment continuously sends idle channel tone signals by way of the RSS base station, whenever an idle channel is available for use. An RSS subscriber's transmitter/receiver set scans all the channels and, upon detection of one of the idle channel tones, switches the frequency of the subscriber's reference oscillator to match that channel. This system, requires as many oscillators in each of the transmitter and receiver sections of each RSS subscriber's transmitter/receiver set as there are channels which are available to be used. Such an arrangement does not readily permit a reduction of the size and manufacturing cost of the hardware.

In contrast, another system is conceivable in which each transmitter/receiver set obtains the transmission and reception carrier wave frequencies from the same oscillator. The channel switching can be facilitated and both the size and cost of the hardware can be reduced. Usually, channel switching in such a system is achieved by either dividing or multiplying the frequency of a reference signal from a single oscillator. Therefore, if the frequency spacing between the transmission and reception carrier waves is constant and fixed, as referred to above, channel switching can be effectively accomplished.

However, the requirement for efficient utilization of frequencies sometimes prevents them from being as arranged as to equalize the frequency intervals between transmission and reception carrier waves, over all the channels. In such a case, the transmitter/receiver sets cannot properly function unless something is done to cope with the unevenness in frequency spacing, because every one of them obtains the reference transmission and reception carrier wave frequencies from the same reference oscillator. One conceivable remedy is to provide, and separately control, separate reference oscillators in the transmitter and receiver sections, but this would neither give satisfactory accuracy nor be economical. Another remedy is to keep one reference oscillator for common use, and to provide the receiver section with a band-pass filter corresponding to each channel. The transmitter has a similar plurality of voltage-controlled oscillators, but this remedy would prevent a reduction of the size and cost of the hardware.

Accordingly, an object of the present invention is to provide a channel switching device for RSS subscribers, which device is capable of switching between a plurality of channels if the frequency spacing between transmission and reception carrier waves is uneven. Here an object is to avoid inviting the foregoing disadvantages.

In accordance with this invention, a channel switching system receives a first plurality of modulated radio frequency carrier waves. A first mixer frequency mixes the outputs of the receiver and a local oscillator. A reference frequency signal is generated and modulated responsive to a first control signal, for converting the reference signal into one out of a plurality of carrier waves respectively corresponding to the first plurality of modulated radio frequency carrier waves. The converted signal is modulated with a signal which is to be transmitted. A second mixer frequency mixes the modulated output with the output of the local oscillator, thereby supplying one out of a second plurality of modulated radio frequency carrier waves. Responsive to a second control signal, the reference frequency signal is frequency-synthesized and supplied to the first and second frequency-mixers with the synthesized signal being used as the local oscillation. Detected designation signals of the first and second pluralities of modulated radio frequency carrier waves are supplied to a suitable demodulating means. Responsive to the detected designation signal, the first and second control signals are supplied to the modulation means and frequency-synthesizing means.

The features and advantages of the present invention will become more apparent from the detailed description hereunder taken in conjunction with accompanying drawings, wherein.

Figure 1:
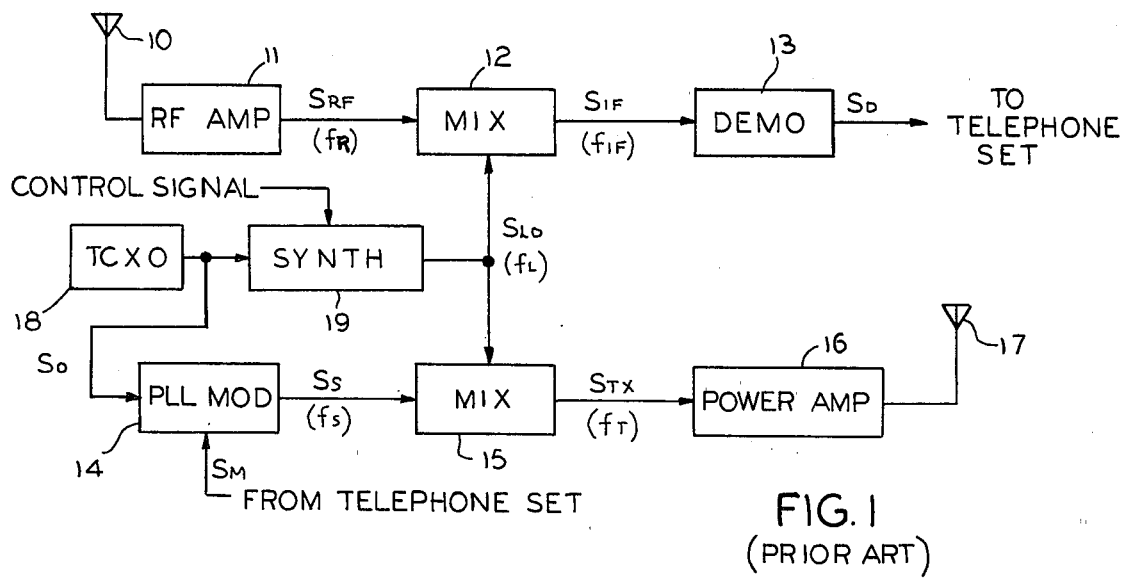
FIG. 1 is a block diagram illustrating a conventional RSS subscriber's transmitter/receiver set having a channel switching function.

In FIG. 1, a modulated carrier wave is received by way of an antenna 10 and supplied to a frequency mixer 12 after being amplified by a high-frequency (RF) amplifier 11. The frequency mixer 12 frequency-mixes the modulated carrier wave and a local oscillation waveform $S_{LO}$, supplied by a synthesizer 19, in order to provide an intermediate-frequency (IF) signal $S_{IF}$. After IF signal $S_{IF}$ is demodulated at a demodulator 13, it is supplied to a telephone set, as demodulated output $S_D$.

An oscillating signal $S_O$, supplied by a reference oscillator 18, is applied to a phase-locked loop (PLL) modulator 14, where it is modulated with a modulating input signal $S_M$ received from the telephone set. The modulated carrier is a signal $S_S$, which is frequency-mixed with the locally-supplied oscillating signal $S_{LO}$ in a frequency mixer 15. The resulting signal is a modulated carrier wave $S_{TX}$ which is transmitted by way of an antenna 17, after having been amplified by a power amplifier 16.

Figure 4:
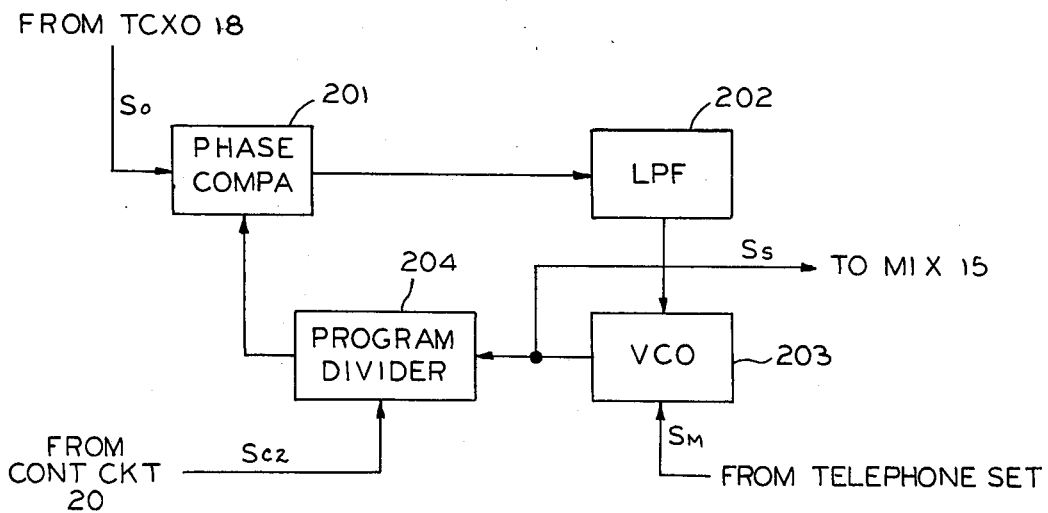
FIG. 4 is a block diagram illustrating an example of the phase-locked loop modulator of the RSS subscriber's transmitter/receiver set according to this invention, also shown in FIG. 2.

The switching between a plurality of channels is achieved by altering a dividing ratio of the frequency divider (not illustrated) contained in the synthesizer 19 and thereby varying the local oscillation frequency $S_{LO}$. Control over on the dividing ratio of the frequency divider is achieved either manually or automatically and, if automatic, it is achieved responsive to an externally derived control signal. This synthesizer 19 can be one which, for instance, is illustrated in FIG. 4 or FIG. 17 in Phase-Locked Loop Systems, pp. 1–11, published by MOTOROLA Semiconductor Products Inc. in August 1978.

In the RSS subscriber's transmitter/receiver set illustrated in FIG. 1, the following relationships hold. The notations are: $f_R$ stands for the frequency of the modulated carrier wave $S_{RF}$, $f_T$ for the frequency of the transmission modulated carrier wave $S_{TX}$, $f_L$ for that frequency of the synthesizer's output $S_{LO}$, and $f_S$ for the frequency of the output $S_S$ of the PLL modulator 14:

$$f_T - f_R = f_{TR} \tag{1}$$

$$f_R - f_L = f_{IF} \tag{2}$$

$$f_T - f_L = f_S \tag{3}$$

where $f_{TR}$ represents the frequency interval between the transmission and reception carrier wave frequencies of each channel. The following relationships between $f_T$, $f_R$ and $f_L$ are assumed:

$$f_T > f_R$$

$$f_R > f_L$$

The following relationship is derived from equations (1), (2) and (3):

$$f_{TR} = f_S - f_{IF} \tag{4}$$

As is obvious from equation (4), the frequency interval between the transmission and reception carrier wave frequencies of each channel is determined by the output frequency $f_S$ of the PLL modulator 14 and the intermediate frequency $f_{IF}$ of the frequency mixer 12 of the receiver section.

In the conventional circuit of FIG. 1, the frequency interval ($f_{TR}$) between the transmission and reception carrier waves may vary from one channel to another. If so, either the frequency $f_S$ or the intermediate frequency $f_{IF}$ has to be altered every time the channel is switched. Altering the frequency $f_S$ requires a plurality of voltage-controlled oscillators in the PLL mmodulator 14.

Changing the frequency $f_{IF}$ necessitates a plurality of band-pass filters on the output side of the frequency mixer 12. An installation of these units prevent a reduction in the size and the cost of the hardware.

Figure 2:
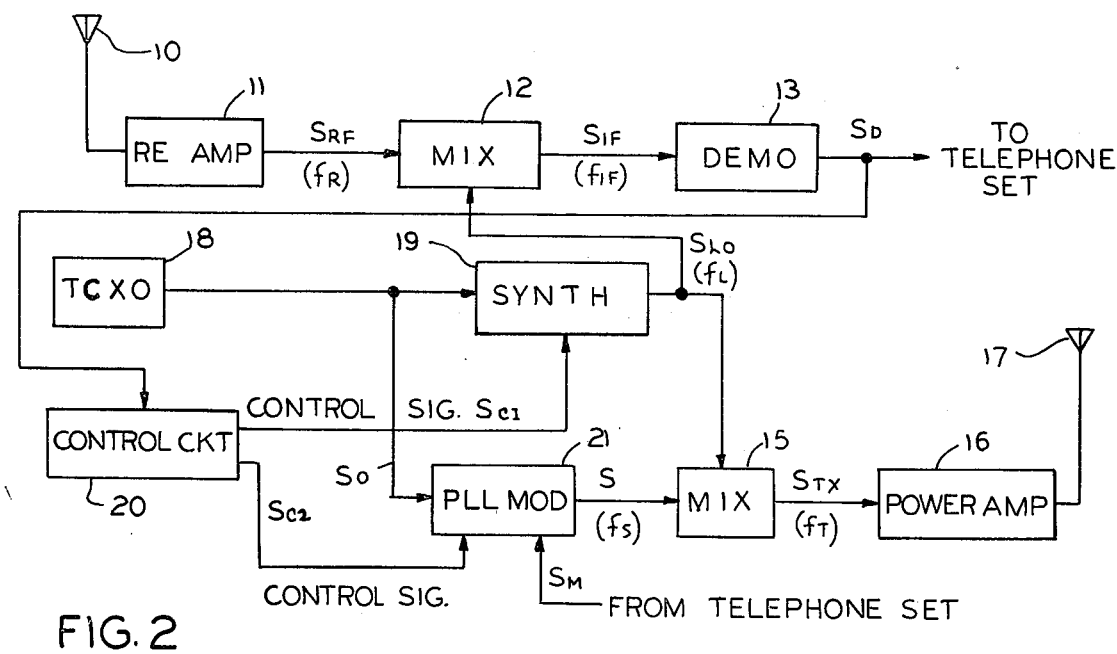
FIG. 2 is a block diagram illustrating a preferred embodiment of the present invention.

In FIG. 2, those elements which have the same functions as the corresponding elements in FIG. 1 are assigned, respectively, the same reference numerals. The actions of this (FIG. 2) RSS subscriber's transmitter/receiver set are the same as the actions of the conventional set illustrated in FIG. 1. However, the FIG. 2 method of controlling the frequency spacing between the transmission and reception carrier waves, in switching the channel is different from the method of the prior art, as described hereunder.

Figure 5A:
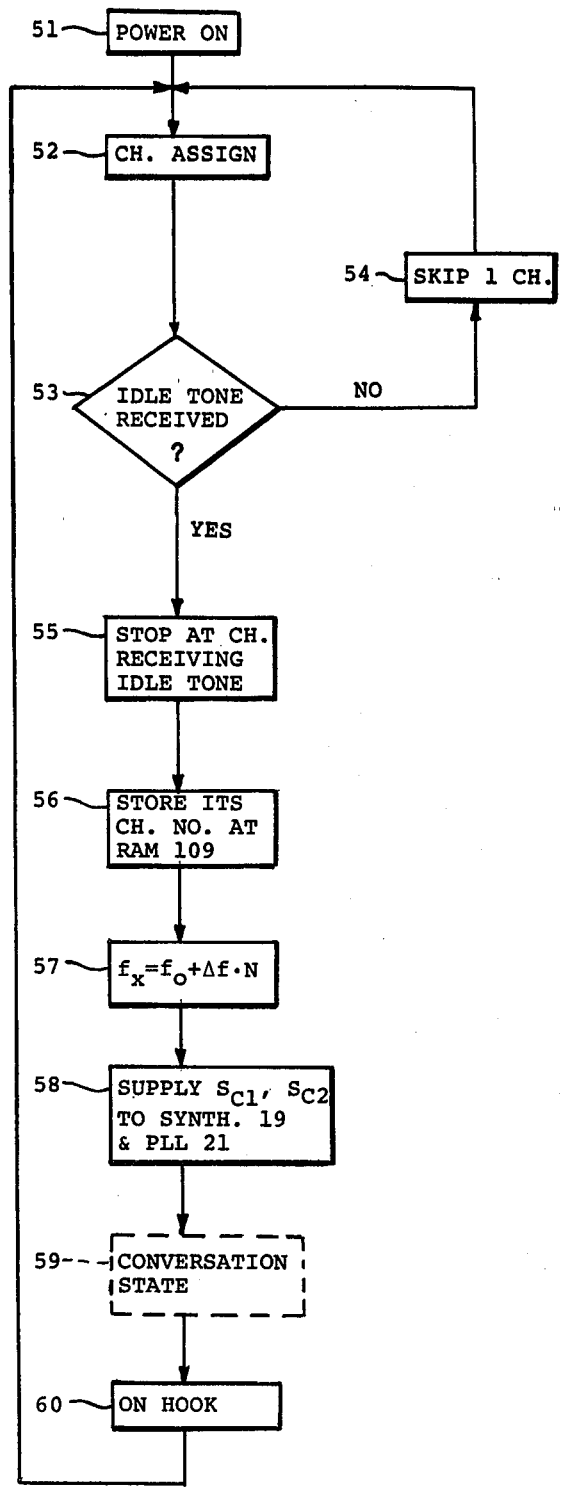
FIGS. 5A and 5B are flow diagrams showing channel assignment operation of the control circuit in the transmitter/receiver set shown in FIG. 2.

A control circuit 20 is coupled to the output of demodulator 13, as stated in the above cited NEC Research & Development literature circuit 20 supplies a control signal $S_{C1}$ to a synthesizer 19 so that all of the channels may be scanned upon actuation of the transmitter/receiver set, as shown at steps 51 through 54 of FIG. 5A. The control circuit 20 stops scanning for an idle channel as soon as it seizes an idle channel having an idle tone signal sent from RSS exchange equipment. Then, control circuit 20 supplies a control signal $S_{C2}$ to a PLL modulator 21 at steps 56 to 58 of FIG. 5A to compensate for the difference in frequency spacing between the transmission and reception carrier waves.

Figure 3A:
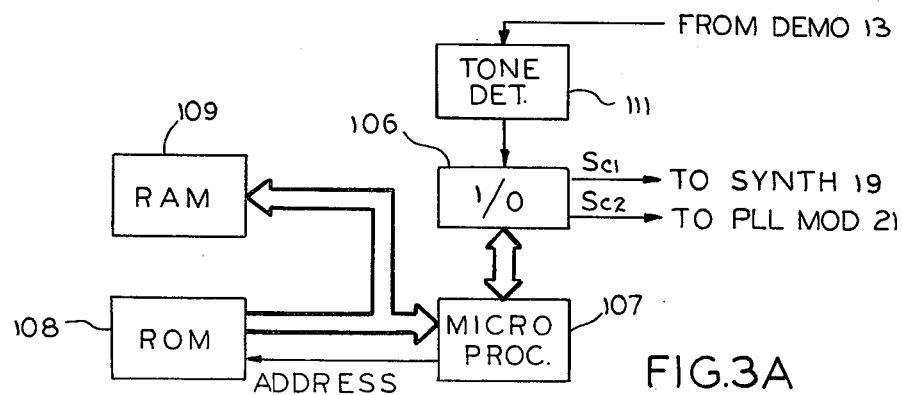
FIGS. 3A and 3B are block diagrams illustrating examples of the control circuit of the RSS subscriber's transmitter/receiver set according to this invention, shown in FIG. 2.

In FIG. 3A, a tone signal detector circuit 111, detects a tone signal received from the output of the demodulator 13, and supplies the detected tone signal to a microprocessor 107 by way of an input/output (I/O) port 106. As soon as it receives this detected tone signal, the microprocessor 107 stops scanning, channels at step 55 of FIG. 5A. Also, the microprocessor 107, at step 56, causes a random access memory (RAM) 109 to temporarily store data relative to the reference number of the channel at which the scanning stopped. At the same time, microprocessor 107 supplies a read only memory (ROM) 108 with an address designation signal to cause a readout of an arithmetic program stored therein.

Supposing that the channel number at which the scanning stopped is N (any natural number), the microprocessor 107 reads out data corresponding to a reference frequency $f_O$ which is stored in the ROM 108 in accordance with an arithmetic program read out of the ROM 108, as shown at step 57 of FIG. 5A. This readout accomplishes, for example, the following operation:

$$f_X = f_O + \Delta f \cdot N$$

where $f_X$ is the frequency of channel N and $\Delta f$ is the frequency difference between channels. At step 58 of FIG. 5A, data on the result of this operation is supplied as control signals $S_{C1}$ and $S_{C2}$ to control the synthesizer 19 and PLL modulator 21, respectively, by way of the I/O port 106. Then, the subscriber enters into conversation, as shown at step 59. When the subscriber finishes the conversation and hangs up his telephone, the microprocessor 107 returns from step 60 to step 52, as shown in FIG. 5A.

Figure 3B:
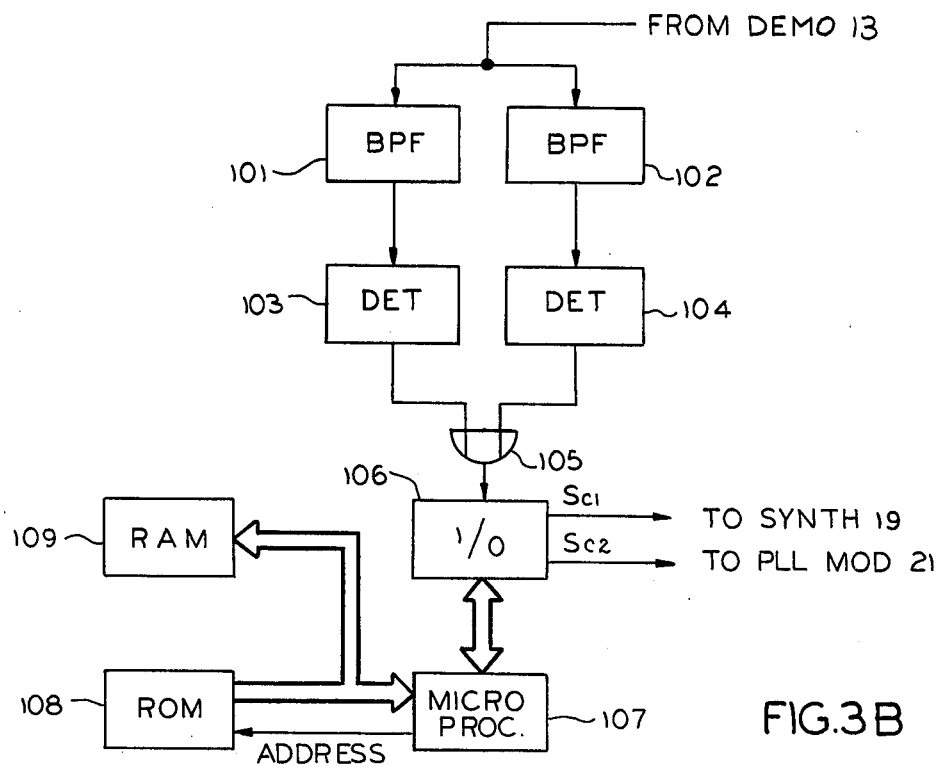
Figure 5B:
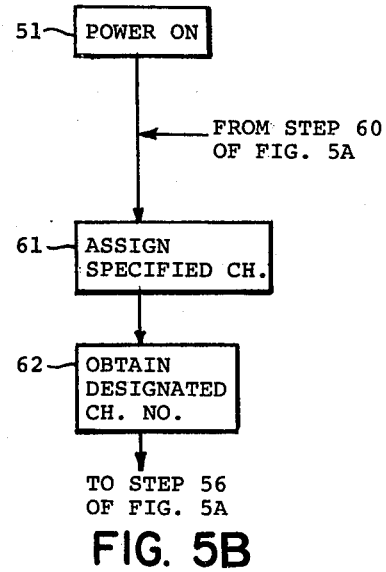

There is another method (FIG. 3B) which achieves channel switching by sending out a channel designation signal over a specified channel from RSS exchange equipment. FIG. 3B is a detailed block diagram illustrating the composition of the control circuit 20 which is used when such a channel designation signal is to be sent over a specified channel. Upon actuation of the transmitter/receiver set, a microprocessor 107 supplies a control signal $S_{C1}$ to a synthesizer 19 at step 61 of FIG. 5B, in order to ready the circuit for a reception of the channel designation signal sent over the specified channel.

The channel designation signal (which is a frequency-shift keying (FSK) signal in this embodiment) is sent over the specified channel. The resulting signal is led from the demodulator 13 to band pass filters (BPFs) 101 and 102. The center frequencies of these BPFs 101 and 102 are respectively set at the mark and space frequencies of the FSK signal. The outputs of the BPFs 101 and 102 are converted by detector circuits 103 and 104, respectively, into digital signals, which are arranged into a series by an OR gate 105.

This series of digital signals, i.e., the channel designation signal, are entered into the microprocessor 107 by way of an input/output (I/O) port 106. The microprocessor decodes the channel designation signal and goes on to step 62 of FIG. 5B, at which the processor 107 obtains data on the channel number. The subsequent processes are the same as those referred to in FIG. 3A and also, the flow diagram of such a process is the same that of FIG. 5A.

In FIG. 4, phase comparator 201 compares the phases of a reference frequency signal $S_O$ from a reference oscillator 18 and a frequency division output from a programmable frequency divider 204. A phase error signal between the two signals, is obtained by the phase comparator 201, and is supplied as an oscillation control signal through a low-pass filter (LPF) 202 to a voltage-controlled oscillator (VCO) 203. The VCO 203 has two controlled terminals, one of which is controlled by the output of the LPF 202 and the other of which is controlled by a modulating signal $S_M$ transmitted from the telephone set.

The output of the VCO 203 is supplied to the programmable frequency divider 204, where it is frequency-divided by a prescribed value and then led to the phase comparator 201. The frequency division ratio of the programmable frequency divider 204 is determined in response to a control signal $S_{C2}$ from the control circuit 20. If the variations of the transmission and reception carrier wave frequency spacing are within the lock range of the PLL modulator, a modulated signal $S_S$ having a plurality of output frequencies ($f_S$) can be obtained, by merely altering the frequency division ratio of the programmable frequency divider 204.

As hitherto described, the channel switching system for RSS transmitter/receiver sets, in accordance with the present invention, more readily permits a reduction of the size and manufacturing cost of the hardware. This is because the invention can vary the frequency spacing between transmission and reception frequencies by merely altering the frequency division ratio of the frequency dividers contained in the synthesizer 19 and PLL modulator 21. Alteration is in conformity with the program of the control circuit 20. The RSS transmitter/receiver set, according to the invention, moreover, is useful for multiple purposes. It can cope with a change in the whole frequency band or the like, by modifying only part of the hardware and software of the control circuit.

What is claimed is:

1. A channel-switching system comprising:

a plurality of channels, each of which transmits and receives over individually associated a transmission and reception carrier waves with a frequency interval between said transmission and reception carrier waves, at least one of said frequency intervals on one of said channels being different from the other frequency intervals on other of said channels;

means for receiving the plurality of reception carrier waves;

means for transmitting the plurality of transmission carrier waves;

first mixer means coupled to said receiving means for frequency-mixing the output of said receiving means with an oscillation signal;

means coupled to said first mixer means for demodulating the output of said first mixer means;

means for generating a reference frequency signal;

modulation means responsive to a first control signal for converting said reference frequency signal into one of a plurality of carrier waves respectively corresponding to said plurality of transmission carrier waves and for modulating the converted signal with a signal which is to be transmitted;

second mixer means coupled to said modulation means for frequency-mixing the output of said modulation means and said local oscillation signal and for supplying the frequency-mixed signal to said transmitting means as one of said plurality of transmission carrier waves;

frequency-synthesizing means responsive to a second control signal for frequency-synthesizing said reference frequency signal to provide said local oscillation signal and for supplying it to said first and second mixer means;

means responsive to the output of said demodulation means for detecting a signal designating a channel number; and means responsive to the detected signal for supplying said first and second control signals to said modulation means and said frequency-synthesizer means, respectively.

2. A channel-switching system as set forth in claim 1, wherein said modulation means comprises a voltage-controlled oscillator means for varying its oscillation frequency in response to a third control signal and said signal which is to be transmitted; means for frequency-dividing the output of said voltage-controlled oscillator means in response to said first control signal; means for phase-comparing said reference frequency signal and the output of said frequency-dividing means; and means for extracting a low-frequency component in the output of said phase comparator means; and means for supplying the output of said extracting means as said third control signal to said voltage-controlled oscillator means.

* * * * *

UNITED STATES PATENT AND TRADEMARK OFFICE
CERTIFICATE OF CORRECTION

PATENT NO. : 4,373,205
DATED : February 8, 1983
INVENTOR(S) : YASUHIRO MIZOTA

It is certified that error appears in the above—identified patent and that said Letters Patent is hereby corrected as shown below:

Col. 1, Line 46, delete the comma ",";

Col. 1, Line 65, delete "as";

Col. 1, Line 66, delete "as";

Col. 3, Line 18, "the" should be --a--;

Col. 3, Line 68, "mmodulator" should be --modulator--;

Col. 4, Line 3, "prevent" should be --prevents--;

Col. 4, Line 17, insert a period --.-- after "literature;

Col. 4, Line 17, change "circuit" to --Circuit--.

Signed and Sealed this

Thirty-first Day of May 1983

[SEAL]

Attest:

DONALD J. QUIGG

Attesting Officer

Acting Commissioner of Patents and Trademarks